E. L. WASHER.
FLUID PRESSURE TRANSMISSION.
APPLICATION FILED JUNE 6, 1917. RENEWED JULY 27, 1920.

1,363,068.

Patented Dec. 21, 1920.
3 SHEETS—SHEET 1.

INVENTOR
Edward L. Washer,
BY Victor J. Evans
ATTORNEY

WITNESSES

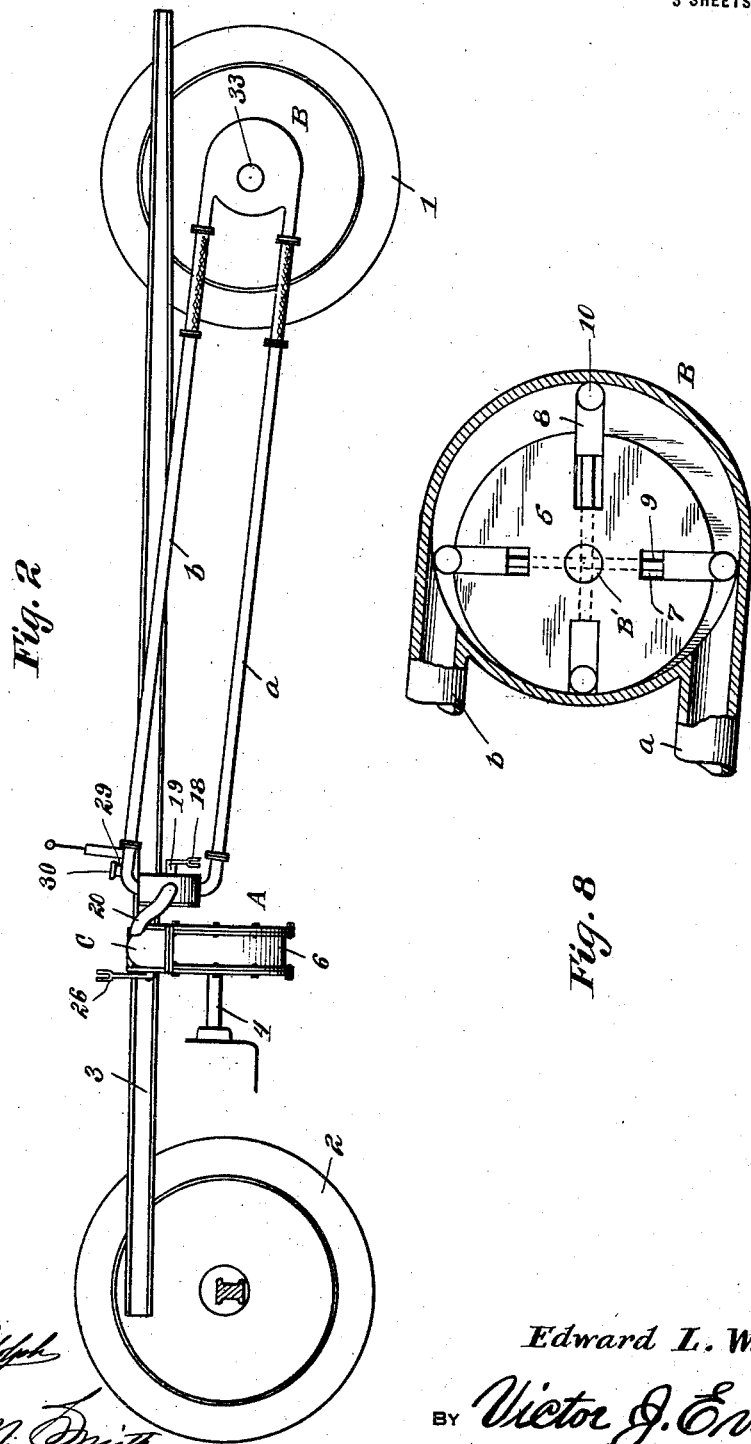

E. L. WASHER.
FLUID PRESSURE TRANSMISSION.
APPLICATION FILED JUNE 6, 1917. RENEWED JULY 23, 1920.

1,363,068.
Patented Dec. 21, 1920.
3 SHEETS—SHEET 3.

INVENTOR
Edward L. Washer,

BY Victor J. Evans
ATTORNEY

WITNESSES

UNITED STATES PATENT OFFICE.

EDWARD L. WASHER, OF DUNMORE, PENNSYLVANIA.

FLUID-PRESSURE TRANSMISSION.

1,363,068.      Specification of Letters Patent.      Patented Dec. 21, 1920.

Application filed June 6, 1917, Serial No. 173,190. Renewed July 27, 1920. Serial No. 399,413.

*To all whom it may concern:*

Be it known that I, EDWARD L. WASHER, a citizen of the United States, residing at Dunmore, in the county of Lackawanna and State of Pennsylvania, have invented new and useful Improvements in Fluid-Pressure Transmissions, of which the following is a specification.

This invention relates to fluid pressure transmission means and while particularly designed for use in place of the ordinary transmission gearing now used in automobile practice, it will be apparent as the description proceeds that the fluid pressure transmission mechanism of this invention may be used in various ways and for various purposes which will readily suggest themselves to the manufacturer.

One of the chief objects of the present invention is to provide fluid pressure transmission mechanism which will embody a comparatively few moving parts, which may be constructed of a relatively small amount of material and which is of considerably reduced weight as compared with the present day automobile transmission gearing including the driving shafts, the differential gearing, rear axle and other parts.

The transmission mechanism hereinafter described eliminates all gears now commonly employed in transmission gearing, reduces the number of working parts to a minimum, materially reduces friction and enables power to be transmitted to any point irrespective of direction or distance within certain limits.

When used in conjunction with automobiles and motor vehicles of different types, the fluid pressure transmission mechanism of this invention eliminates the ordinary clutch, drive shaft, universal joints, pinion gear, and the rear differential driving mechanism. The improved transmission mechanism enables any desired speed to be obtained and is practically noiseless in operation.

With the above and other objects in view, the invention consists in the novel construction, combination and arrangement of parts, herein fully described, illustrated and claimed.

In the accompanying drawings:—

Fig. 2 is a similar view showing another embodiment of the invention.

Fig. 8 is a sectional view of the fluid motor.

The fluid pressure transmission mechanism contemplated in this invention, is shown for convenience as applied to the chassis of a motor vehicle and used as the main driving means between the engine of the vehicle and the driving wheels.

Figure 1:
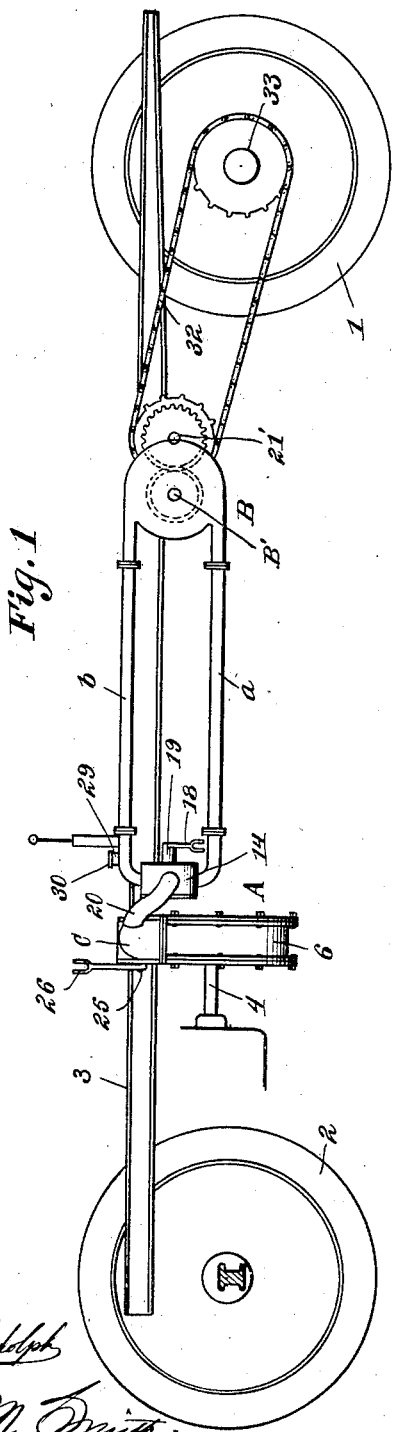
Figure 1 is a side elevation of the chassis of a motor vehicle illustrating the improved transmission mechanism in its applied relation thereto, under one embodiment of the invention.
Figure 7:
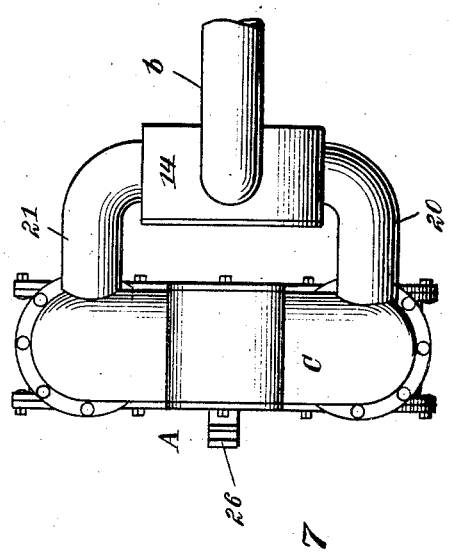
Fig. 7 is a fragmentary top plan view showing the relative arrangement of the pump or driving member and the main controlling valve, and the connection between said parts.

In Figs. 1 and 2, 1 designates the rear driving wheels, 2 the front steering wheels, 3 the frame of the chassis and 4 the engine shaft or a shaft receiving its power directly from the engine, the latter not being shown.

In carrying out the present invention, I employ what is in effect a pump designated generally at A and a motor designated generally at B. Said motor and pump are designed to control a body of fluid such as air, water, oil or the like and for that purpose the casings of the pump A and the motor B are connected by conduits $a$ and $b$ as illustrated in Figs. 1 and 2.

Figure 3:
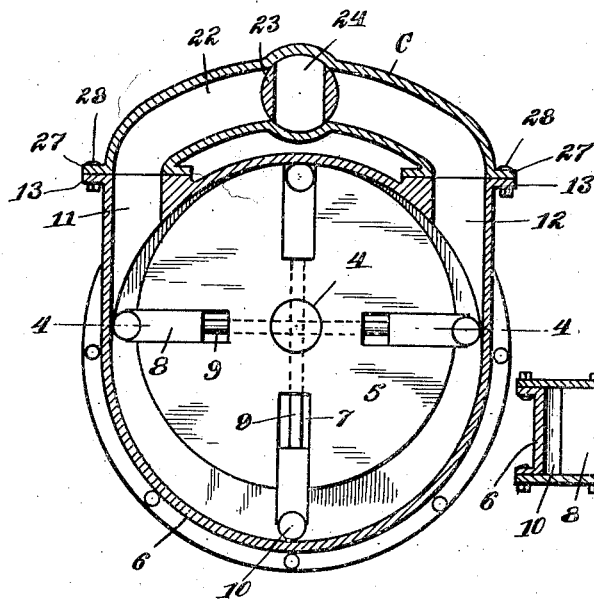
Fig. 3 is an enlarged vertical transverse section through the motor.
Figure 4:
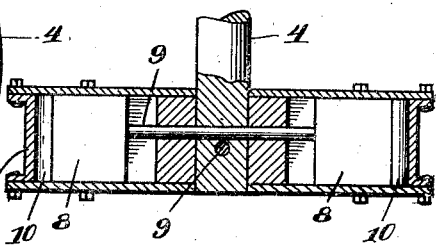
Fig. 4 is a section on the line 4—4 of Fig. 3.

The pump or initial member of the transmission mechanism embodies a driving rotor 5 which is fast on the shaft 4 and receives its power therefrom. The rotor, as shown in Fig. 3, is mounted within a substantially cylindrical and stationary casing 6, being eccentrically arranged therein and being formed with radially disposed guideways 7 in which are mounted radially movable wings or abutments 8 slidable in the guideways 7. Four of such sliding wings or abutments are illustrated in Fig. 3 and diametrically opposite wings are connected by a diametrically disposed rod 9 causing such diametrically opposite wings to move simultaneously and equally in the same direction. Each of said wings or sliding abutments carries at its outer extremity a roller 10 which operates in contact with the inner surface of the casing 6.

The casing 6 is provided with tangentially disposed inlet and outlet necks 11 and 12. Each of said connections is provided with a flange 13 to enable the conduits hereinafter described to be fastened thereto. The above description relative to the driving rotor 5 and casing 6 applies in all particulars to the motor B and it is therefore not necessary to further describe the motor B in detail.

Figure 5:
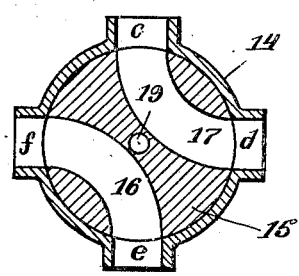
Fig. 5 is an enlarged vertical transverse section through the main controlling valve.
Figure 6:
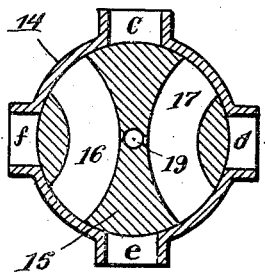
Fig. 6 is a section on the same line as Fig. 5 showing the main controlling valve in a different position.

Located behind the pump A is the casing 14 of the main fluid transmission controlling valve 15, said valve having two ways or passages 16 and 17 therethrough with the receiving and discharge ends of each passage preferably 90° apart, as shown in Figs. 5 and 6. The valve 15 is of the tapered plug type so as to maintain a liquid or fluid tight fit in its casing. The casing 14 embodies four openings $c$, $d$, $e$ and $f$, said openings being arranged in diametrically opposite pairs as shown. The opening $c$ communicates with the conduit $b$ and the opening or port $e$ communicates with the conduit $a$. The valve 15 is controlled by an operating arm 18 on the stem 19 of the valve, which stem extends through a wall of the casing and projects beyond the same as indicated in Figs. 1 and 2.

Interposed between the casing 6 of the pump A and the casing 14 of the controlling valve 15, is a manifold designated generally at C and comprising the legs 20 and 21 and a bypass 22. A tapered turn plug valve 23 is incorporated in the bypass 22, about centrally thereof, and comprises a single way or passage 24. The valve 23 has its stem 25 extended through a wall of the bypass 22 and the projecting end thereof is provided with an operating arm 26. The end portions of the bypass 22 are flanged as indicated at 27 and the manifold C is fixedly secured to the casing 6 by fastening means 28 shown in the form of screws or bolts inserted through the flanges 27 and 13. The leg 20 of the manifold communicates with the port $f$ of the valve casing 14, while the leg 21 communicates with the port or opening $d$ of the valve casing 14. The desired fluid is introduced in the system hereinabove described through a filling neck 29 closed by a cap 30.

Under the arrangement illustrated in Fig. 1, the shaft B' of the motor is geared to a countershaft 21 arranged in rear thereof and connected by chains 32 to the rear driving wheels 1 of the machine. Such an arrangement allows for the relative up and down movement between the axle 33 of the rear driving wheels and the frame 3 of the chassis. If desired the motor B may be mounted directly on the rear axle 33 as indicated in Fig. 2 and then in order to allow for the said relative up and down movement between the frame 3 and the driving wheels 1, the conduits $a$ and $b$ must be made of some suitable flexible material such as high pressure hose or reinforced rubber tubing. Of course, it will not be necessary to make the full length of the conduits $a$ and $b$ of such flexible tubing but it may be found necessary to incorporate flexible sections in said conduits $a$ and $b$ preferably adjacent to the forward extremities of said conduits where they connect with the valve casing 14.

From the foregoing description taken in connection with the accompanying drawings the operation of the fluid pressure transmission apparatus will now be understood. The driving rotor 5 being actuated by the shaft 4 driven directly by the engine, and the entire system being filled with any suitable fluid or liquid, such fluid or liquid is propelled by the wings 8 and caused to circulate through the conduits $a$ and $b$ and the motor B thereby transmitting motion to the shaft B' of the motor and to the driving wheels of the vehicle. By turning the main controlling valve 15 in one direction so that the ports 16 and 17 will occupy the position shown in Fig. 5, the fluid is forced through the leg 20 and the conduit $a$ into the casing of the motor B, returning through the conduit $b$ and the leg 21 of the manifold to the casing 6 of the pump. By giving the valve 15 a quarter turn, the flow of the fluid or liquid will be in the opposite direction. This enables the vehicle to be driven in either direction. By turning the valve 15 to an intermediate position as illustrated in Fig. 6, said valve blocks the flow of liquid or fluid in rear thereof so that the vehicle cannot be moved. By opening or closing the valve more or less, the speed of the vehicle may be retarded to a proportionate degree, the mechanism thus acting as a brake. When the fluid transmission is in operation, the valve 23 is closed so as to prevent any flow of the fluid through the bypass 22. By opening the valve 23, the flow of the fluid is shunted and no power is transmitted to the motor B and consequently the driving wheels of the vehicle.

I claim:—

In fluid pressure transmission apparatus, the combination of a power driven rotary pump, a distantly located rotary motor driven thereby, a by-pass having its opposite ends in tangential communication with said pump to receive the fluid therefrom and return the same thereto, a cut-off plug valve in a medial part of said by-pass having a single diametrical port therethrough, a reversing two-way valve arranged between said by-pass and said motor and formed as a casing having its wall provided with ports arranged at 90° apart, conduits connecting opposite ports of said reversing valve casing with oppositely tangentially disposed ports of said motor, and pipes connecting said by-pass at opposite sides of said cut-off plug valve with said reversing valve casing at the ports between the said conduits, said reversing valve further including a rotary plug formed with arcuate passages adapted to establish communication between said pipes and said conduits selectively.

In testimony whereof I affix my signature.

EDWARD L. WASHER.